United States Patent [19]

Wagenbach et al.

[11] Patent Number: 4,769,740

[45] Date of Patent: Sep. 6, 1988

[54] PRESSURIZED GAS-INSULATED THREE-PHASE ENCAPSULATED HIGH-VOLTAGE CIRCUIT BREAKER

[75] Inventors: Wolfgang Wagenbach, Birstein; Heinrich Neumaier, Hanau; Heinrich Probst, Blankenbach; Theo Peitz, Hanau; Paul Westbrock, Laudenbach, all of Fed. Rep. of Germany

[73] Assignee: BBC Aktiengesellschaft, Brown, Boverie & Cie, Baden, Switzerland

[21] Appl. No.: 25,016

[22] Filed: Mar. 12, 1987

[30] Foreign Application Priority Data

Mar. 14, 1986 [DE] Fed. Rep. of Germany ....... 3608548

[51] Int. Cl.[4] ............................................. H02B 13/02
[52] U.S. Cl. ................................. 361/335; 200/148 D; 361/333
[58] Field of Search ........... 200/148 R, 148 D, 148 E; 361/331–333, 335, 341, 355, 361

[56] References Cited

U.S. PATENT DOCUMENTS

| | | | |
|---|---|---|---|
| 1,843,286 | 2/1932 | Jansson | 361/333 |
| 1,980,739 | 11/1934 | Andorff et al. | 361/335 |
| 3,243,560 | 3/1966 | Wilson | 200/148 R |
| 3,612,798 | 10/1971 | Barton et al. | 200/148 D |
| 3,723,685 | 3/1973 | Thurk et al. | 200/148 E |
| 4,172,270 | 10/1979 | Kiyohuni et al. | 200/148 D |
| 4,197,438 | 4/1980 | Korner et al. | 200/148 D |
| 4,658,329 | 4/1987 | Kamura et al. | 361/333 |

FOREIGN PATENT DOCUMENTS

| | | | |
|---|---|---|---|
| 0747037 | 11/1966 | Canada | 200/148 D |
| 0103522 | 8/1979 | Japan | 361/341 |
| 0434419 | 10/1967 | Switzerland | 200/148 E |
| 1081994 | 9/1967 | United Kingdom | 200/148 E |

Primary Examiner—A. D. Pellinen
Assistant Examiner—Gregory D. Thompson
Attorney, Agent, or Firm—Herbert L. Lerner; Laurence A. Greenberg

[57] ABSTRACT

A pressurized gas-insulated circuit breaker includes a substantially tubular encapsulating housing having ends, a plurality of circuit breaker poles in phases, at least one of which is disposed in the encapsulating housing, and current feed lines. Each line leading to a respective one of the circuit breaker poles. Current discharge lines each lead from a respective one of the circuit breaker poles. The current feed and discharge lines to and from each respective circuit breaker pole being disposed at the same one of the ends of the encapsulating housing. Supplemental conductors are each disposed in the encapsulating housing and are each extending parallel to and forming a U-shape with a respective one of the circuit breaker poles.

6 Claims, 6 Drawing Sheets

PRESSURIZED GAS-INSULATED THREE-PHASE ENCAPSULATED HIGH-VOLTAGE CIRCUIT BREAKER

BACKGROUND OF THE INVENTION

The invention relates to a pressurized gas, particularly $SF_6$-gas, insulated electric circuit breaker, including phases, at least one of which is encapsulated, particularly metal-encapsulated, for high and medium voltage, with one current feed line and one current discharge line leading to and away from each circuit breaker pole.

Circuit breakers encapsulated in three phases have a tubular housing, within which the three poles of a circuit breaker are disposed parallel to the longitudinal axis thereof; the current feed is located at one end of the housing, i.e. on one side of the contact, whereas the current discharge is disposed at the other end of the housing, i.e. on the other side of the contact. The relationship of the current feed and the current discharge to the circuit breaker poles can form a U-shape or a Z-shape.

It is accordingly an object of the invention to provide a a pressurized gas-insulated, three-phase, encapsulated high-voltage circuit breaker, which overcomes the hereinafter-mentioned disadvantages of the heretofore-known devices, which requires less space in the train of the current conduction apparatus.

SUMMARY OF THE INVENTION

With the foregoing and other objects in view there is provided, in accordance with the invention, a pressurized gas-insulated, preferably $SF_6$-gas-insulated, circuit breaker, comprising a substantially tubular encapsulating, preferably metal encapsulating, housing having ends, a plurality of circuit breaker poles in phases, at least one of which is disposed in the encapsulating housing, current feed lines each leading to a respective one of the circuit breaker poles, current discharge lines each leading from a respective one of the circuit breaker poles, the current feed and discharge lines to and from each respective circuit breaker pole being disposed at the same one of the ends of the encapsulating housing, and supplemental conductors each being disposed in the encapsulating housing and each extending parallel to and forming a U-shape with a respective one of the circuit breaker poles.

The invention can be applied to circuit breakers in which one or more poles are encapsulated and accommodated in a metal or insulating material-encapsulated housing. The invention can be applied to particular advantage in high-voltage circuit breakers encapsulated in accordance with three phases, since then, the special advantages are most significant.

In such circuit breakers encapsulated in three phases there are thus three approximately U-shaped current feeds according to the invention within the encapsulating housing, with a total of six conductor parts which extend parallel to the central axis of the encapsulating housing and form legs, three of which each form the circuit breaker poles and the other three of which form the corresponding supplemental conductors. This achieves the advantage that the current feed into the housing and the current discharge from the housing, are always substantially in the vicinity of one end of the housing or on one side of the plane and in a preferred embodiment they are aligned with each other, with the housing itself having a substantially T-shape.

In accordance with another feature of the invention, the circuit breaker poles are disposed at corners of a triangle, and each of the supplemental conductors associated with a given one of the circuit breaker poles is located between the other circuit breaker poles.

In accordance with a further feature of the invention, the current feed and discharge lines lie in one plane.

The embodiment according to the invention can be used if the circuit breaker poles lie side-by-side in one plane or at the corners of a triangle. In any case, the current feed and discharge conductors are preferably located at the upper end of the circuit breaker housing.

Other features which are considered as characteristic for the invention are set forth in the appended claims.

Although the invention is illustrated and described herein as embodied in a pressurized gas-insulated, three-phase, encapsulated high-voltage circuit breaker, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of specific embodiments when read in connection with the accompanying drawings.

DESCRIPTION OF THE PREFERRED EMBODIMENTS

Figure 1:
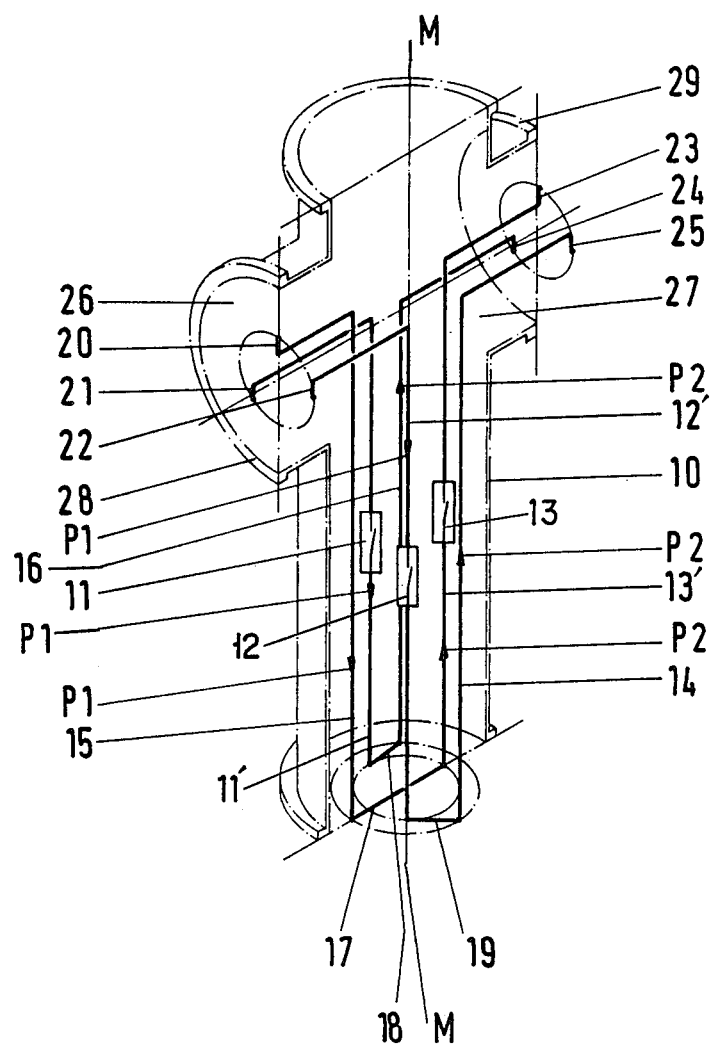
FIG. 1 is a diagrammatic, perspective view of the apparatus according to the invention, showing supplemental conductors disposed at the edges of a a triangle similar to the poles; and wherein the triangle formed by the supplemental conductors is turned a certain angle allowing the supplemental metal conductors to be placed between the poles.
Figure 2:
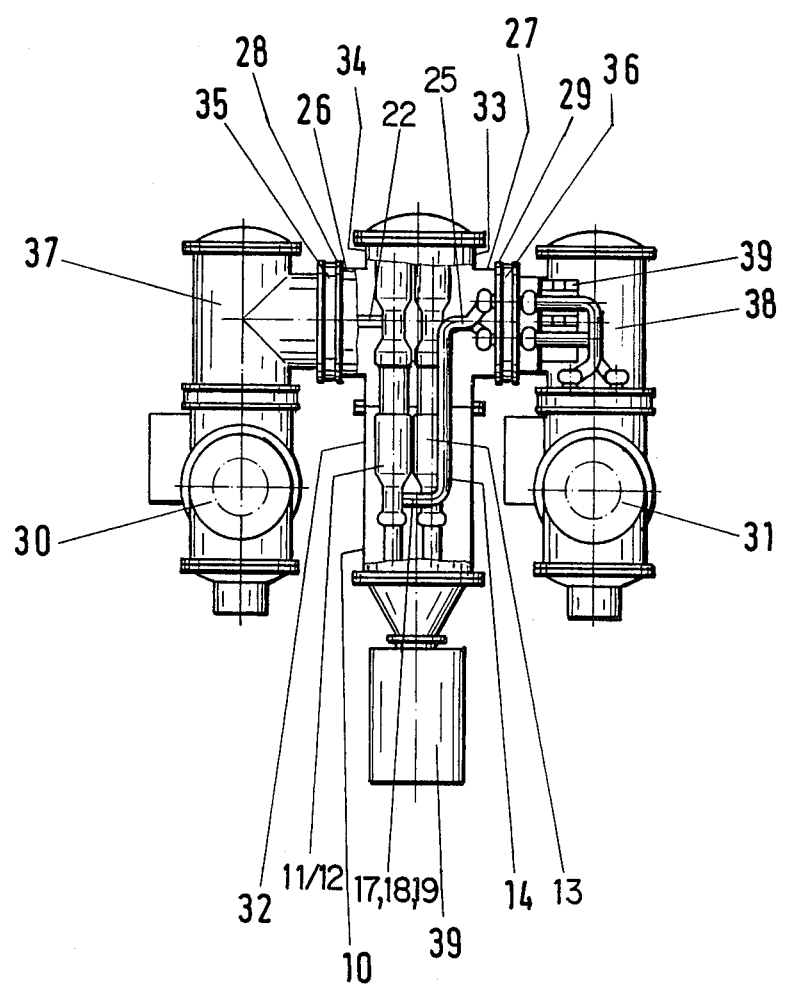
FIG. 2 is side-elevational view, which is partly broken away, showing the installation of the embodiment according to FIG. 1 in a cross coupling section.

Referring now to the figures of the drawings in detail and first, particularly, to FIG. 1 thereof, it is seen that three circuit breaker poles 11, 12 and 13 which are disposed at the corners of a triangle, are accommodated within a tubular housing 10 that is shown in phantom and extend parallel to the longitudinal axis M—M of the housing 10. Supplemental conductors 14, 15 and 16 which are disposed between the circuit breaker poles 11, 12 and 13, are also at the corners of a triangle which is rotated relative to the triangle formed by the circuit breaker poles 11, 12, 13. The supplemental conductors 14, 15 and 16 extend parallel to the circuit breaker poles 11, 12 and 13 and are connected to the corresponding circuit breaker poles 11, 12 and 13 at the bottom of the housing 10, as seen in the orientation of the drawing, by conductor bridges 17, 18 and 19. Current feed lines 20, 21 and 22 and current discharge lines 23, 24 and 25 at the upper end of the housing 10 follow the circuit breaker poles 11, 12 and 13 and the supplemental conductors 14, 15 and 16. The current feed lines 20, 21 and 22 and current discharge lines 23, 24 and 25 are each brought out from the housing 10 through a respective opening in encapsulating tubes 26, 27 in the housing 10, transverse to the longitudinal central axis M—M and are surrounded by the encapsulating tubes 26 and 27, which form substantially a T-shape with the housing 10. Similar to the circuit breaker poles, the respective current feed and discharge lines 20, 21, 22 and 23, 24, 25 are located at the corners of a triangle, but they can alternatively lie in one plane as indicated in FIG. 2, from which they are deflected by L-shaped intermediate pieces without reference numerals. The lines are deflected in direction to tubular gas tracks following the current lead and discharge lines, and the phase conductors thereof are then normally disposed in the triangle. Connecting flanges 28 and 29, which are discussed further below, are disposed at the end of the encapsulating tubes 26 and 27. The current flow, through the circuit breaker pole 11, takes place as follows: the current flows through the current feed conductor 21 downward in the direction of the arrow $P_1$ and through the supplemental conductor 16 upward to the current discharge conductor 24. Through the circuit breaker pole 12, the current flows as follows: through the feed conductor 22 downward in the direction of the arrow $P_1$ and through the supplemental conductor 14 upward, according to the arrow $P_2$. The direction of the current through the circuit breaker pole 13 flows from the current feed line 20 downward according to the direction of the arrow $P_1$ through the supplemental conductor 15 and then upward in direction of arrow $P_2$ through circuit breaker pole 13. In this manner, the current in the circuit breaker pole 11 flows downward and again upward to the circuit breaker poles 12 and 13.

The circuit breaker poles 11, 12 and 13 are disposed in the conductor sections 11', 12' and 13' respectively, and the lower positioned conductor bridges 17, 18 and 19 respectively connect the supplemental conductor 15 with the conductor section 13', the supplemental conductor 16 with the conductor section 11', and the supplemental conductor 14 with the conductor section 12'.

FIG. 2 shows an installation of the circuit breaker, which is only shown diagrammatically in FIG. 1, in a transverse coupling section between two bus bar devices 30 and 31. The housing 10 is formed of two housing parts 32 and 33, wherein the a lower housing part 32 is tubular and the upper housing part 33 has the shape of a cross having a section 34. The central axis of the section 34 is aligned with the housing part 32 and with a section 35 in the form of a compartment insulator extending transversely thereto, at which the two encapsulating tubes 26 and 27 are disposed. The circuit breaker poles 12 and 13 (pole 11 is obscured), the conductor bridge 19 (the conductor bridges 17 and 18 are obscured) and the supplemental line 14 can be seen in the interior of the housing 10. The current feed line 22 and the current discharge line 25 are at the upper end of the circuit breaker pole 12. In the embodiment according to FIG. 2, the current feed lines 21 and 22 and the current discharge lines 24 and 25 each lie in one plane, from which these three current feed and discharge lines are deflected to the corners of the triangle by means of L-shaped connecting pieces without reference numerals. This construction is known in the art and reference should also be made to FIGS. 4 to 6. The encapsulating tubes 26 and 27 are followed by the flanges 28 and 29, and they are in turn followed, with the interposition of the compartment insulators 35 and 36, by further encapsulated switches 37 and 38 which serve for rerouting the current feed lines downward to the respective bus bar devices 30 and 31. As can be seen from FIG. 2, disconnect switches and current transformers 39 can be accommodated in the two encapsulating parts 37 and 38, in order to accomplish a transverse coupling operation between two bus bar systems. It is of less importance for the invention that a drive 39 is disposed below the housing 10 and a voltage transformer is disposed above the housing 10. Accordingly, this will not be discussed in detail herein.

Figure 3:
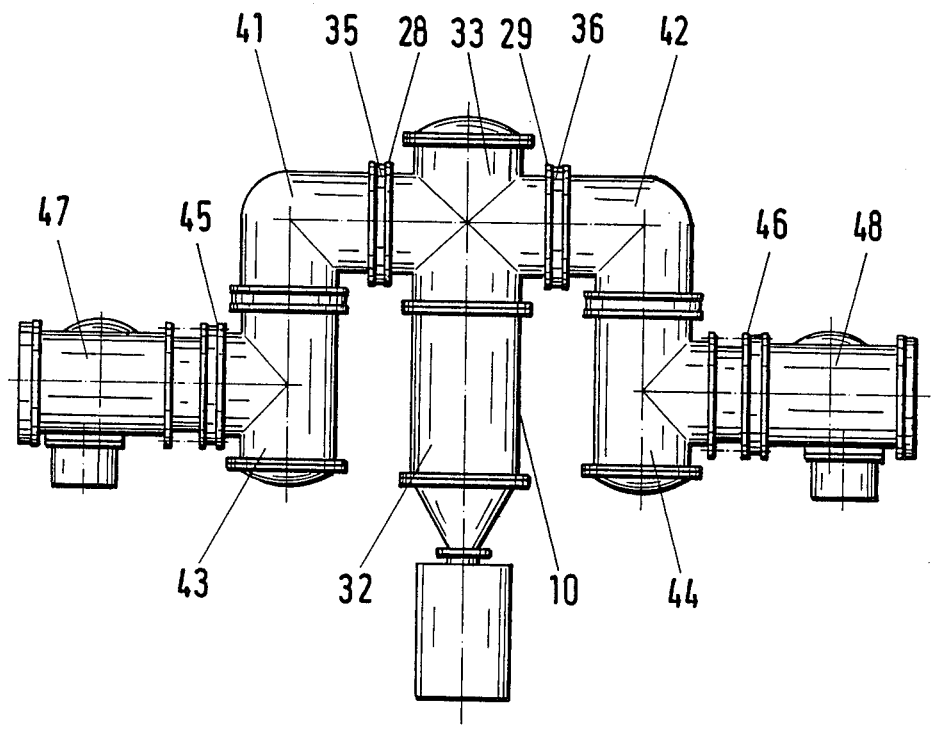
FIG. 3 is a side-elevational view of the circuit breaker according to FIG. 1, in a series coupling section.

FIG. 3 shows how the circuit breaker according to FIG. 1 is accommodated in a bus bar train. It is again seen that the housing 10 is formed of the two housing parts 32 and 33. Encapsulation parts 41 and 42 are connected to the two flanges 28 and 29 with the interposition of the compartment insulators 35 and 36. The encapsulation parts 41 and 42 are bent off in L-fashion and are each connected to a respective T-shaped housing 43 and 44, having respective flanges 45 and 46 which are followed by a left bus bar train 47 and a right bus bar train 48; the two bus bar trains 47 and 48 are mutually aligned in the illustrated embodiment.

The housing 10 proper which is formed of the two encapsulating parts 32 and 33, has the shape of a cross or a T, wherein the circuit breaker poles are accommodated together with the supplemental conductors in the leg of the T, and the current feed and discharge lines are accommodated in the cross piece.

Figure 4:
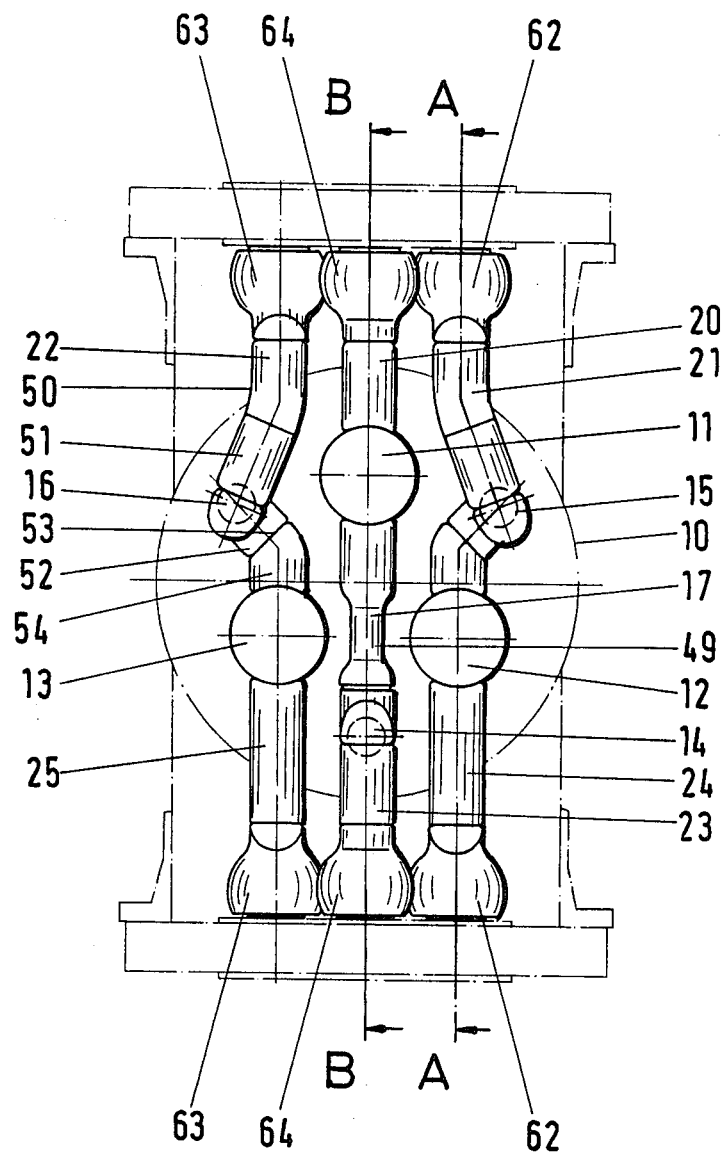
FIG. 4 is a top-plan view of a detailed embodiment of the invention in a different embodiment from that shown in FIG. 1, having an additional conductor.

Reference will now be made to FIG. 4 in which a top view of the circuit breaker can be seen in the interior of a three-pole embodiment of the housing 10, which is shown in phantom. The circuit breaker poles 11, 12 and 13 are located at respective corners of a triangle. The lead 21 extends to the circuit breaker pole 11 and the conductor bridge 17 can be seen at the lower end of the circuit breaker pole to have a section 49 of constructed cross section in the area between the two circuit breaker poles 12 and 13, in order to maintain insulating spaces at that location. The supplemental conductor 14 is covered from above, specifically by the current discharge conductor 23. The current feed line 22 has an angular subpart 50 which is followed by a connecting piece 51 which is connected to the supplemental conductor 16 that is also covered. The supplemental line (i.e. "conductor") 16 is followed by a connecting piece 52 which extends at an angle to the current feed line 22 and which is electrically connected to an inclined surface 53 of a further connecting piece 54 corresponding to the connecting piece 50. The other end of the connecting piece 54 is connected to the lower end of the circuit breaker pole 13. The current discharge line (i.e. "conductor") 25 is then connected at the upper end of the circuit breaker pole 13. Due to the angular piece 50 and the angular inclined surface 53 with the parts 51 and 52, the supplemental line 16 is located outside the connecting lines of the feed line 22 and the discharge line 25; in this way, the insulating of the two conductor sections 50, 51 as well as of the two sections 52 and 54 from the circuit breaker pole 11 is assured; in other words, the circuit breaker pole 11 is enclosed by the feed conductor train up to the vertical supplemental conductor 16 and from there up to the circuit breaker pole 13 at an electrically adequate distance.

In the same manner, the supplemental conductor 15 is also disposed outside the connecting lines of the current feed and current discharge lines or conductors 21, 24, and the connecting pieces leading thereto correspond identically to the connecting or terminal pieces 50, 51, 52 and 54. They are disposed symmetrical to the center line which lies in the plane of the section line B—B.

Figure 5:
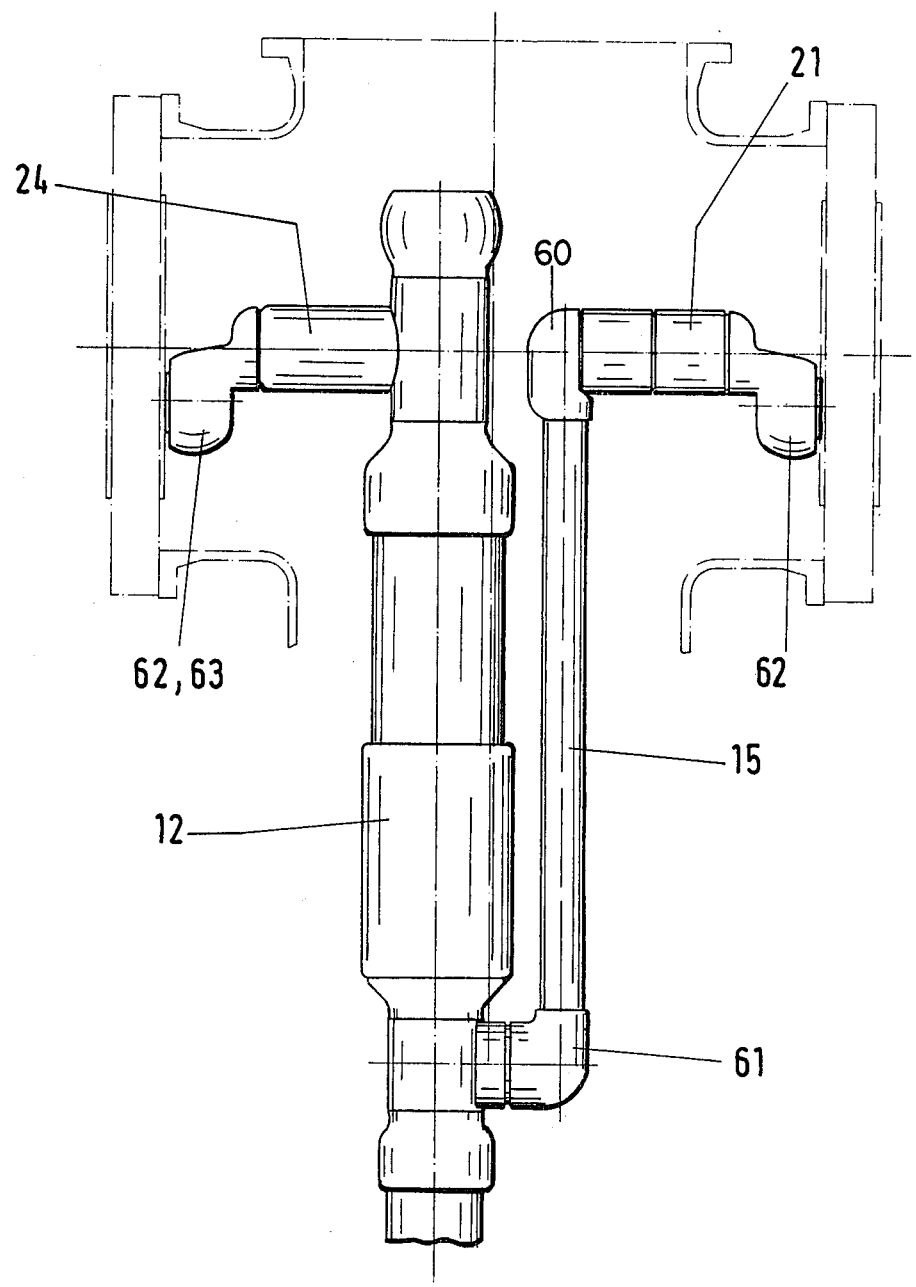
FIG. 5 is a cross-sectional view taken along the line A—A of FIG. 4 in the direction of the arrows.
Figure 6:
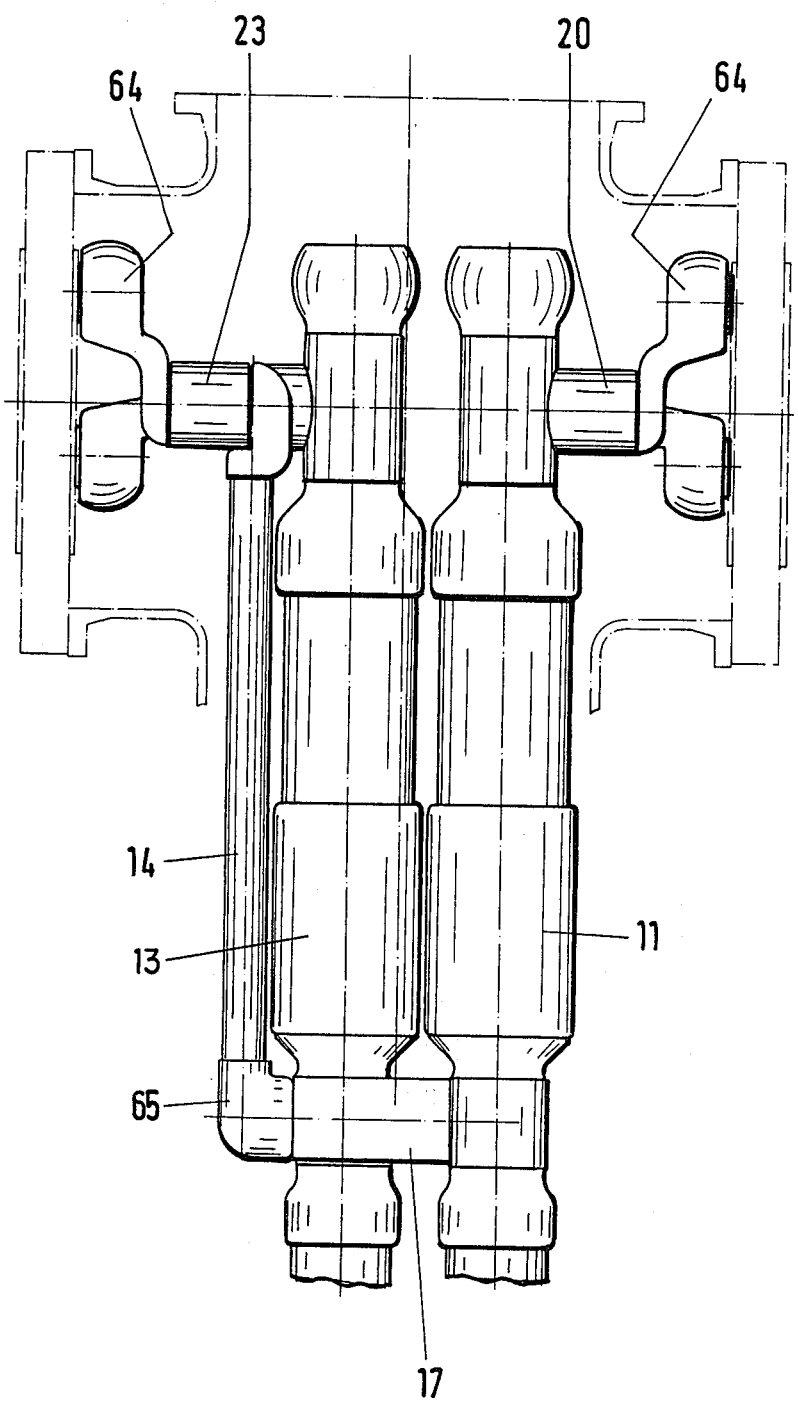
FIG. 6 is a coss-sectional view taken along the line B—B of FIG. 4, in the direction of the arrows showing lines located in a plane, adapted for contacting the phase conductors being located on the edges of a triangle.

FIG. 5 shows a sectional view according to the section line A—A of FIG. 4. The supplemental conductor 15 of FIG. 5 is constructed as a tubular conductor which has an operating end connected through an angular piece 60 to the feed conductor 21 and which is connected through a further angular piece 61 to the lower end of the circuit breaker pole 12. The upper end of the circuit breaker pole 12 runs through the current discharge conductor 24 to an L-shaped connecting piece 62 angled-off downward for connecting of a phase conductor continuing at the left thereof. Similarly, an angular piece 63 corresponding identically to an angular piece 62 is connected to the circuit breaker pole 13 disposed behind the circuit breaker pole 12; As shown in FIG. 6, an L-shaped connecting piece 64 is connected to the circuit breaker pole 11 and the corresponding supplemental conductor 14 is which is angled upwards. This is done so that the L-shaped connecting pieces 62, 63 and 64 cause the current discharge conductors 25, 23 and 24 which lie in one plane to also be deflected to a phase conductor located on a triangle. Equal L-shaped connecting pieces are provided on the opposite side.

FIG. 6 shows a sectional view taken along the line B—B of FIG. 4. FIG. 6 shows the current discharge conductor 23 and the L-shaped connecting piece 64 connected thereto; the supplemental conductor 14; a conductor section in the form of the conductor bridge 17, which is connected through a connecting conductor section 65 to the lower end of the supplemental conductor 14. The circuit breaker pole connected thereto has the reference numeral 11 and is connected at the upper end thereof to the corresponding connecting piece 20 which leads to the corresponding connecting piece 64.

In the embodiments described above, the respective current feed and discharge lines or conductors lie above the contact point of the circuit breaker pole. Of course, they can also be located below. They can be diametrically opposite each other or they can occupy any angle between them, for instance, 90 degrees.

What is claimed is:

1. Pressurized gas-insulated circuit breaker assembly, comprising a substantially tubular encapsulating housing having a bottom end and two oppositely facing top ends, a plurality of circuit breaker poles serving respective phases, at least one of said poles being disposed in said encapsulating housing, current feed lines each leading to a respective one of said circuit breaker poles, current discharge lines each leading away from a respective one of said circuit breaker poles, said current feed and discharge lines respectively leading to and away from each respective circuit breaker pole being disposed within the respective oppositely facing top ends of said encapsulating housing, said current feed and discharge lines including supplemental U-shaped conductors each being disposed in the bottom end of said encapsulating housing and each forming a leg of said U-shaped conductor and connected to a respective one of said circuit breaker poles.

2. Circuit breaker assembly according to claim 1, wherein said encapsulating housing is insulated with $SF_6$ gas.

3. Circuit breaker assembly according to claim 1, wherein said encapsulating housing is metal for high and medium voltages.

4. Circuit breaker assembly according to claim 1, wherein said breaker poles are disposed at corners of a triangle.

5. Circuit breaker assembly according to claim 2, wherein said current feed and discharge lines for each circuit breaker pole lie in one common plane.

6. Circuit breaker assembly according to claim 1, wherein said encapsulating housing has respective feed and discharge points disposed in said top ends.

* * * * *